H. BEHM & J. VENE.
TIRE.
APPLICATION FILED JUNE 2, 1914.
1,152,779.
Patented Sept. 7, 1915.
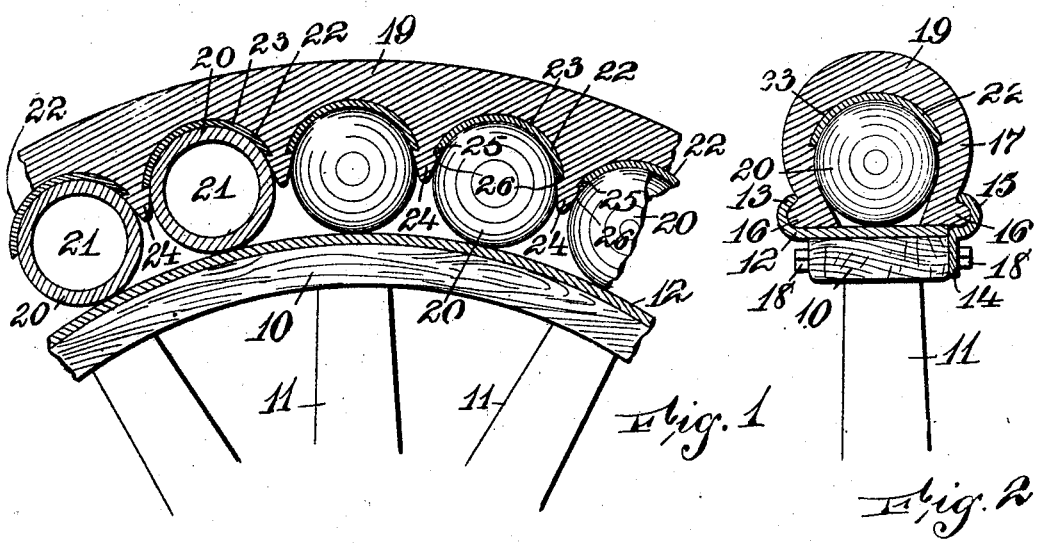

UNITED STATES PATENT OFFICE.

HENRY BEHM AND JOSEPH VENE, OF ELIZABETH, NEW JERSEY, ASSIGNORS OF ONE-FIFTH TO SAID BEHM, ONE-FIFTH TO SAID VENE, ONE-FIFTH TO WILLIAM MARKS, ONE-FIFTH TO GEORGE J. STREISEL, SR., AND ONE-FIFTH TO CHARLES C. MAIR, ALL OF ELIZABETH, NEW JERSEY.

TIRE.

1,152,779.  Specification of Letters Patent.  Patented Sept. 7, 1915.

Application filed June 2, 1914. Serial No. 842,395.

*To all whom it may concern:*

Be it known that we, HENRY BEHM, a subject of the Emperor of Germany, and JOSEPH VENE, a subject of the King of Italy, and residents of Elizabeth, county of Union, and State of New Jersey, have invented certain new and useful Improvements in Tires, of which the following is a specification.

This invention relates to a tire for vehicles and is a resilient tire, the resiliency being supplied by elements placed inside of the shoe of the tire, the elements acting as individual members to provide resiliency to the tire at the point where each member is placed. The tire is of the type that is adapted for use without danger of puncture, the separate resilient element being adapted to be used a long time, and so installed and made that in the event of any one of them collapsing or being otherwise destroyed, a new element can be easily installed in the tire.

The invention further provides a tire of this type, in which the resilient elements, which are preferably balls, are held in place by suitable cups within the shoe of the tire, the cups being disposed to prevent undue wear between the balls and the shoe, and also between adjacent balls. The cups are preferably made of material that is puncture-proof and will prevent any pointed or sharp object that might get through the shoe from penetrating into the balls.

The invention also provides means for holding the balls detachably to the shoe so that a supplemental shoe or strip can be made, according to this invention, and placed within the shoe of an old tire, the old tire thus being made ready for use.

This tire requires no inflation after the tire is in place on the rim, and provides a tire that will wear a long time without having its resiliency or usefulness impaired. A tire constructed according to this invention, even if it has its shoe punctured, can still be used on a vehicle. In fact, if some of the resilient elements are punctured, provided they are inflated elements, the remaining elements will carry the tire so that it is not necessary to do emergency repairing to a tire of this kind.

The invention comprises details of construction which are fully described in this specification and finally embodied in the clauses of the claim.

The invention is illustrated in the accompanying drawings, in which—

Figure 1 is a longitudinal section of the rim of a wheel and our improved tire, several of the resilient elements being shown in elevation and several in section. Fig. 2 is a cross section of the tire illustrated in Fig. 1, the resilient element in the figure being shown in elevation. Fig. 3 is a view similar to Fig. 1, but showing the invention as constructed to be used as a supplemental strip and placed inside of an old shoe.

In the embodiment of the invention shown in Figs. 1 and 2 we illustrate a wheel made of a felly 10, which is of any form, supported by spokes 11 or other elements forming the body portion of a wheel, the felly having a fixed rim 12 thereon which is turned up at one side to form a flange 13. The other edge of the felly is provided with a plate 14 and a flange 15, the flanges 13 and 15 being adapted to clench projections 16 of the shoe 17, the bolts or nuts 18 being utilized to hold the parts in their locking or normal positions. It will be understood that this form of fastening the shoe to the rim is simply to illustrate one type of fastening means, and any suitable means for securing the parts together can be employed. The shoe is provided with a tread 19, this portion being preferably made heavier than the rest of the shoe so that it will stand the wear due to its traction on the ground, as will be evident. Within the shoe are suitable resilient elements 20, which can be of any desired form and of any suitable material, but we prefer to make them in the shape of balls and to form them in hollow shape so as to provide chambers 21 so as to increase the elasticity or resiliency of the balls. The balls are protected on their outer surfaces by means of cups 22 which fit the outer faces of the balls and rest in cavities 23, these cavities being arranged between projections 24. It will be evident from this construction that the balls are free to be compressed to a desired extent, the spaces between the balls and toward the rim allowing for the distortion of the balls, which follows when they are compressed. The projections 24 separate the balls and prevent their undue wearing against each other, and also prevent their longitudinal movement in the shoe. The cups 22 are made of material that is adapted to resist puncture, metal being the material that is usually used, a light metal being preferred, but one that will ordinarily resist the further progress of any objects that penetrate the tread of the shoe far enough to engage the cup. The cups are preferably held in place by reason of their edges 25 fitting in the undercut edges 26 of the cavities 23. It will thus be seen that a cup can be forced into its cavity, the cup moving the projections 24 slightly apart when the cup is being inserted, but after it is in place the projections, which form the longitudinal limits of the cavities, spring into place, and the undercut edges 26 engage the edges 25 of the cups and the cups are ready to receive the balls.

If desired, the balls can be held against accidental removal by extending the projections slightly beyond the line of centers of the balls and thus hold the balls in place. This type is shown in Fig. 3. In this figure, however, we show a strip 27 which is a supplemental strip or tread and is adapted to be laid inside the shoe of an old tire. In this construction the projections 24ᵃ are extending beyond the line of centers of the balls 20, the side edges 28 of the projections engaging the balls and holding them in place against the cups 22ᵃ so that the strip can be handled with the balls attached to it, the balls being simply pressed into their position, this being possible on account of their resiliency or compressibility. In this construction the projections separate the balls so as to hold them against movement against each other and the cups form fenders or protectors for the balls in case any sharp object penetrates the shoe of the tire.

The drawings show hollow balls, these being preferably made of rubber, but it will be understood that other forms and material may be used, and solid balls of resilient material might also be used, the resiliency being determined by the amount of compression, or load that the tire is expected to carry. In case of a heavy vehicle the solid rubber balls can be used, and in the case of lighter vehicles hollow rubber balls or solid balls made of sponge rubber can be employed.

It will further be evident that if, for some reason, one of the balls needs to be removed from the tire, due to its collapse or for any other reason, the shoe can be released so that the resilient element in question can be removed and another one put in its place, and then when the shoe is fastened down the tire is again ready for use without the necessity of blowing it up.

Having thus described our invention what we claim is:

1. In a tire, a shoe with projections on its inner face, balls between the projections, whereby the balls are held against longitudinal movement, the projections being higher than the radius of the balls, but less in height than the diameter of the balls; and puncture-proof cups between the projections and covering the outer surfaces of the balls, the projections spacing the balls apart but leaving them free to expand at their inner portions.

2. In a tire, a shoe having a series of projections on its inner face, the spaces between the projections being cup-shaped with their edges undercut, cups fitting said cavities and being held in place by reason of their edges engaging the undercut edges of the cavities, and balls in the cups, the balls being resilient, the projections extending between the balls and being in excess of the radius of the balls, but less in height than the diameter of the balls.

In testimony that we claim the foregoing, we have hereunto set our hands, this 1st day of June, 1914.

HENRY BEHM.
JOSEPH VENE.

Witnesses:
CHAS. C. MAIR,
WILLIAM MARKS.